United States Patent
Hjorth

(10) Patent No.: US 7,889,596 B2
(45) Date of Patent: Feb. 15, 2011

(54) METHOD AND A SYSTEM FOR DETERMINING THE POSITION OF A DRILL BIT

(75) Inventor: Jan Hjorth, Lindingö (SE)

(73) Assignee: Guideline AB, Stockholm (SE)

( * ) Notice: Subject to any disclaimer, the term of this patent is extended or adjusted under 35 U.S.C. 154(b) by 522 days.

(21) Appl. No.: 11/795,695

(22) PCT Filed: Jan. 23, 2006

(86) PCT No.: PCT/SE2006/000089

§ 371 (c)(1),
(2), (4) Date: Apr. 30, 2008

(87) PCT Pub. No.: WO2006/078216

PCT Pub. Date: Jul. 27, 2006

(65) Prior Publication Data

US 2009/0122644 A1    May 14, 2009

(30) Foreign Application Priority Data

Jan. 21, 2005    (SE) .................................. 0500157

(51) Int. Cl.
*G01V 1/00*    (2006.01)
(52) U.S. Cl. ............................. 367/27; 181/102; 175/45
(58) Field of Classification Search ................. 181/102; 175/40, 45; 367/33, 27
See application file for complete search history.

(56) References Cited

U.S. PATENT DOCUMENTS

| 4,144,949 | A | 3/1979 | Silverman |
| 4,460,059 | A | 7/1984 | Katz |
| 4,964,087 | A | 10/1990 | Widrow |
| 5,031,158 | A | 7/1991 | Chamuel |
| 5,680,906 | A | 10/1997 | Andrieux et al. |
| 6,816,435 | B2 | 11/2004 | Hjorth et al. |
| 7,512,034 | B2 * | 3/2009 | Haldorsen .................... 367/57 |
| 2003/0137899 | A1 | 7/2003 | Hjorth et al. |

FOREIGN PATENT DOCUMENTS

WO    01/75268    10/2001

OTHER PUBLICATIONS

Ragnar Slunga et al., "Absolute and Relative Locations of Similar Events With Application to Microearthquakes in Southern Iceland", Geophys. J. Int., 1995, pp. 409-419, vol. 123.

* cited by examiner

*Primary Examiner*—Mark Hellner
(74) *Attorney, Agent, or Firm*—Drinker Biddle & Reath LLP

(57) ABSTRACT

A method and a system for determining the position of a drill bit are presented. The method comprises determining positions of seismic wave detectors, recording seismic waves generated at the drill bit, identifying events at the drill bit, determining a plurality of relative positions of the drill bit, and determining, based at least partly on a starting position and a sum of the relative positions, an absolute position of the drill bit. The method further comprises determining a position of the drill bit at a second event in relation to a position of the drill bit at a first event, and determining a second seismic wave propagation velocity between the drill bit and at least one of the detectors, based at least partly on the determined position of the drill bit at the second event.

14 Claims, 6 Drawing Sheets

METHOD AND A SYSTEM FOR DETERMINING THE POSITION OF A DRILL BIT

TECHNICAL FIELD

The present invention relates to a method and a system for determining the position of a drill bit.

BACKGROUND

WO01/5268A1 relates to a method for estimating the position and trajectory of a drill during drilling of boreholes in rock. WO01/75268A1 presents an adaptation to drill positioning of a method used for determining the relative position of similar microearthquake events described in Geophys. J. Int. (1995), 123, 409-419, by Slunga, Rögavaldsson and Bödvarsson. The method in WO01/75268A1 comprises the steps of determining the starting position of the drill bit and recording the received transient seismic waves generated by the drill on impact, and estimating the difference in arrival time between events. Using these estimations, the relative distances between the positions of the drill bit at different events are calculated and from these the present position is calculated.

The method described in WO01/75268A1 is particularly suitable when the length of the bore hole to be drilled is limited. However, when the drilling process reaches further, the properties in the rock may have changed considerably, in turn changing the propagation velocities of the seismic waves generated by the drill bit. Further, these changes are impossible to predict. Also, the propagation velocity differences may increase further by other discontinuities in the rock, such as cracks.

More particularly, in the method described in WO01/75268A1, the result is obtained by making the assumption that the propagation velocity in the rock in which drilling is performed is the same at two consecutive events. When only studying relative time differences between two events, errors due to varying properties in the rock are eliminated, or at least negligible, if these properties can be considered to be constant between the events, which is likely if the distance between the drill bit and a geophone is considerably longer than the distance between the position of the drill bit at the most recent event and the position of the drill bit at the current event. If the distance between the drill bit and a geophone is in the order of at least $10^2$ times the distance traveled by the drill bit between the events, or more, errors due to varying properties in the rock are negligible. Thereby, the angular difference between the two signals is so small, that the two signals can be considered to propagate almost the same way through the rock towards a specific geophone, and thus through the same discontinuities in the rock. As a result, the difference in propagation velocity, and the corresponding arrival time difference would nearly or completely cancel.

The method described in WO01/75268A1 is particularly suitable when the length of the bore hole to be drilled is limited. FIG. 4 shows a rock drilling of a bore hole 10 in progress. During the drilling, the position of the drill bit 11 is calculated using transient seismic waves received by number of geophones, of which four is shown, 12a, 12b, 12c and 12d. It is to be understood, however, that in normal conditions, more than four geophones, e.g. 8 or more geophones, should be used since signals from one or more geophones usually is disturbed. When the drilling has reached a first location $A_1$, in which a positioning of the drill bit is performed, the transient seismic wave generated by an event at the drill bit propagates along the path a, towards the geophone 12d. When the drill bit has reached a little bit further down the hole and its position again is about to be measured, at position $A_2$, the transient seismic wave propagates along the path $a_2$ towards the geophone 12d. The distance between the positions $A_1$ and $A_2$ is small, e.g. in the order of 0.25 m or 1 m, while the distance between $A_1$ and 12d, and the distance between $A_2$ and 12d may be 100 m or more. Accordingly, it can be understood that differences between propagation velocities along the paths $a_1$ and $a_2$ can be considered to be the same. As an example, the position of the drill bit may be calculated every 15 s or every minute, e.g. when an exemplary drilling process has reached a further 0.25 m or 1 m, respectively.

However, when the drilling process has reached further, e.g. to a location $B_1$, the properties in the rock may have changed considerably. The distance between the positions $A_1$ ($A_2$) and $B_1$ may be in the order 500 m or more, e.g. 1000-5000 m. In this case, the transient seismic wave generated by an event at the drill bit at $B_1$ propagates along the path $b_1$ towards the geophone 12d. When, as described above, the drill bit has reached a little bit further down the hole and its position is again about to be measured at position $B_2$, the transient seismic wave propagates along the path $b_2$ towards the geophone 12d. As easily can be understood, as the distance between the positions $B_1$ and $B_2$ still is equally small, and the distance between $B_1$ ($B_2$) and 12d now is considerably longer, the differences between the propagation velocities along the paths $b_1$ and $b_2$ is even smaller and thus even more likely to be the same or almost the same.

However, even if the propagation velocities of two consecutive measurements, such as $A_1$-$A_2$ or $B_1$-$B_2$ can be considered to be the same, the same assumption is not likely to be true regarding paths $a_1$ ($a_2$) and $b_1$ ($b_2$) owing to a number of reasons. Firstly, when drilling very deep bore holes, such as when drilling for oil or natural gas, the nature of the rock may change considerably as the drilling proceeds. Further, these changes are impossible to predict. This is exemplified in FIG. 4 where the line C represents a transition from one kind of rock to another, wherein the nature of the rock $C_1$ above the line C may have a propagation velocity that differs substantially from the propagation velocity in the rock below the line C. Thus, if the propagation velocities along a1 and b1 (and along corresponding paths towards the other geophones) would be considered to be the same, the resulting calculated position of the drill bit may, instead of being calculated as the correct position $B_1$, instead be calculated to be the position indicated by $B_1'$, which may differ substantially from the position $B_1$. Further, the propagation velocity differences between paths a1 and b1 may increase further by other discontinuities in the rock, such as cracks 13, 14. Even further, the propagation velocity varies with the increase in rock pressure and temperature as the drilling propagates further in depth. As is appreciated by a person skilled in the art, the above applies equally well to the other geophones 12a-c.

SUMMARY OF THE INVENTION

It is an object of the present invention to make it possible to determine, with a greater accuracy than known solutions, the position of a drill bit.

It is also an object of the present invention to make it possible to determine, with a greater accuracy than known solutions, the position of a drill bit when drilling deep holes in the ground.

These objects are reached with a method for determining the position of a drill bit, comprising determining a starting position of the drill bit, determining a position of each of a plurality of seismic wave detectors, recording, by means of the detectors, data relating to transient seismic waves generated at the drill bit, identifying, based on the seismic wave data from the detectors, events at the drill bit, determining for each of the detectors a seismic wave propagation velocity between the drill bit and the respective detector, determining a plurality of relative positions of the drill bit, based at least partly on the seismic wave propagation velocities and differences in arrival time, at least some of the detectors, of seismic waves from events, and determining, based at least partly on the starting position and a sum of the relative positions, an absolute position of the drill bit, characterised in that the method comprises determining for each of at least some of the detectors, a first seismic wave propagation velocity between the drill bit and the respective detector, determining, based at least partly on the first seismic wave propagation velocities relating to at least some of the detectors, a position of the drill bit at a second event in relation to a position of the drill bit at a first event, and determining a second seismic wave propagation velocity between the drill bit and at least one of the detectors, based at least partly on the determined position of the drill bit at the second event.

This provides for wave propagation velocity alterations during drilling being accounted for in the determining of the position of the drill bit, which in turn increases the accuracy in the drill bit position determination. Also, it results in a reliable positioning of the drill bit even when drilling very deep bore holes.

Preferably, the step of determining a second seismic wave propagation velocity between the drill bit and at least one of the detectors, is performed partly based on the difference in arrival time, at the at least one detector, of seismic waves from the first and second events. Preferably, at least one re-determination of at least one seismic wave propagation velocity is dependent partly on the length of the drill rod fed into the ground.

The seismic wave propagation velocity can be re-determined repetitively as the drilling process proceeds, for example at predetermined time intervals, or from one event to the consecutive event.

Preferably, the method comprises time-alignment of the seismic wave data of at least some of the detectors based at least partly on frequency deviations and/or noise and/or other deviations of the detector signals. Preferably, seismic wave data of at least one of the detectors is time shifted to obtain signal conformance and thereby the difference in arrival time of seismic waves from two events. This has the advantage that it can be ascertained that signals from the very same event (e.g. drill bit impact) are used in the calculations.

The objects are also reached with a system according to any of the claims 8-14.

BRIEF DESCRIPTION OF THE DRAWINGS

Below, the invention and further advantages thereof will be described in greater detail with reference to the drawings, in which.

DETAILED DESCRIPTION

Figure 1:
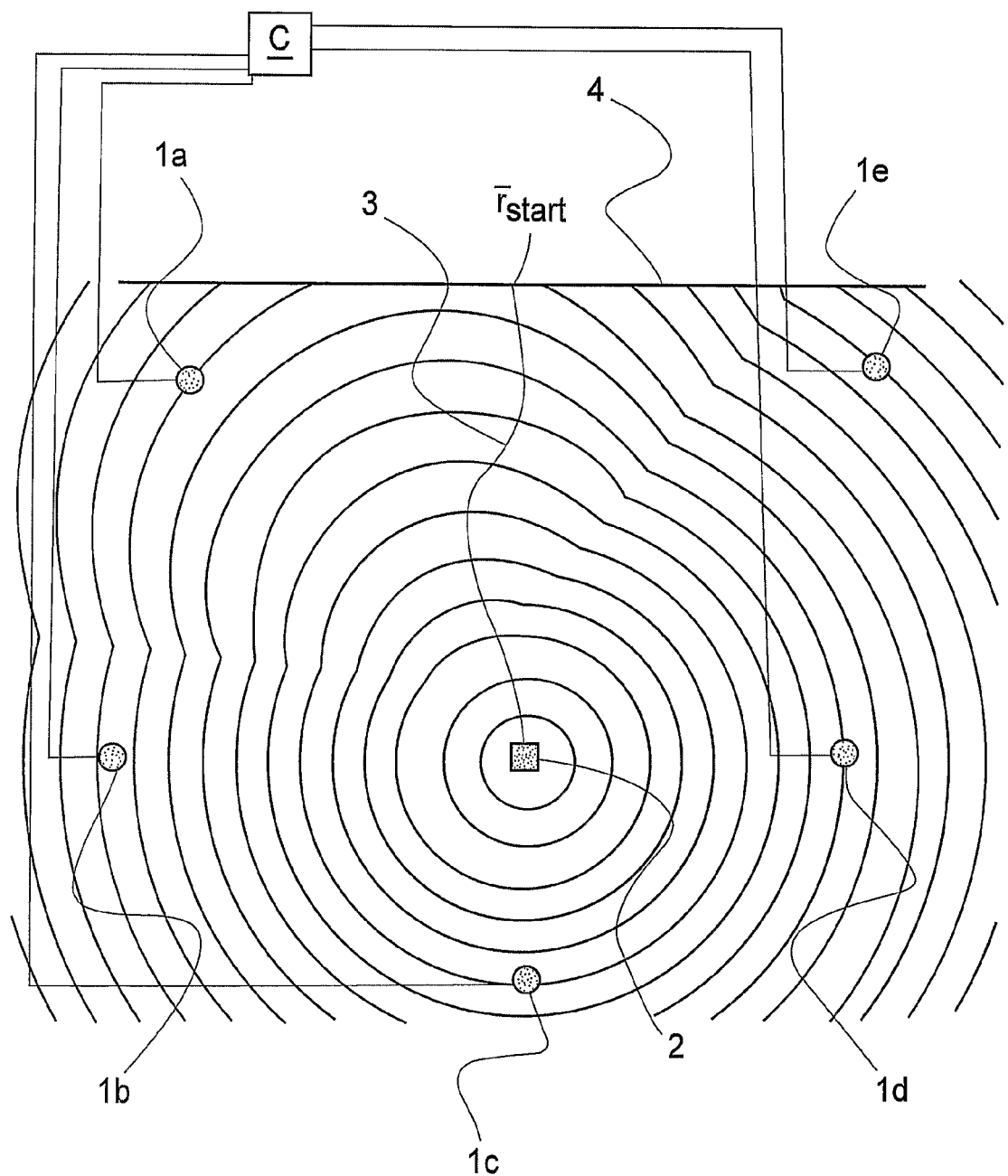
FIG. 1 shows schematically a vertical cross-section of an inhomogeneous rock, with a drill, geophones and wave propagation through the rock.

FIG. 1 shows a drill bit 2, its trajectory 3 from the surface 4 to its present position in the ground, and five seismic wave detectors in the form of geophones 1a-e at various positions in the ground. Computation means C, e.g. one or more computers, with computational and storage capabilities, is adapted to receive signals from the geophones. It should be noted that in the method according to the invention for determining the position of the drill bit, alternatively, only four, or more than five geophones can be used. To both determine the position of the drill bit and recalculate the wave propagation velocity, signals from at least four geophones are required. However, in practice, with a greater the number of geophones, more accurate results can be obtained.

In order to establish an absolute position of the drill bit, a starting position $\bar{r}_{start}$ of the drilling is necessary, and a position of each of the geophones 1a-1e. The starting position $\bar{r}_{start}$ relative to the positions of the geophones can easily be calculated by the computation means C since the absolute geographical positions of the geophones and starting position $\bar{r}_{start}$ easily can be obtained by any suitable positioning system, such as GPS (Global Positioning System) or direct measurement. If the actual starting position is unsuitable for use as starting position $\bar{r}_{start}$ for the drill positioning in the drilling process, an alternative starting position can easily be determined, in a manner known in the art, by using measurement data from the geophones and/or measuring the length of the drill rod fed into the bore hole.

By means of the geophones data relating to transient seismic waves generated at the drill is recorded during drilling. For each of the geophones 1a-e, a seismic wave propagation velocity between the drill bit and the respective geophone is determined, based on a position of the drill bit, the position of the respective geophone, and seismic wave data recorded by the respective geophone. For example, the seismic wave propagation velocity between the drill bit and a geophone can be determined by correlating seismic wave data recorded at a known position of the drill bit, for example the starting position $\bar{r}_{start}$, and seismic wave data recorded by the geophone, to obtain a time of travel for the waves, and obtaining the velocity by dividing the distance between the drill bit and the geophone by the time of travel.

Thus, the seismic wave propagation velocities can differ from one geophone to another. However, these velocities can be assumed to be the same for some or all of the geophones.

FIG. 1 shows seismic waves propagating from the drill bit, illustrated as a series of circles centred essentially at the drill bit. In the upper left portion of the figure, the wave propagation velocity is higher than in the rest of the figure, as can be seen by the longer wavelength of the waves in that portion of the ground. Thus, the seismic wave propagation velocity between the drill bit and the upper left geophone in FIG. 1 will be higher than the seismic wave propagation velocity between the drill bit and the other geophones.

Figure 2:
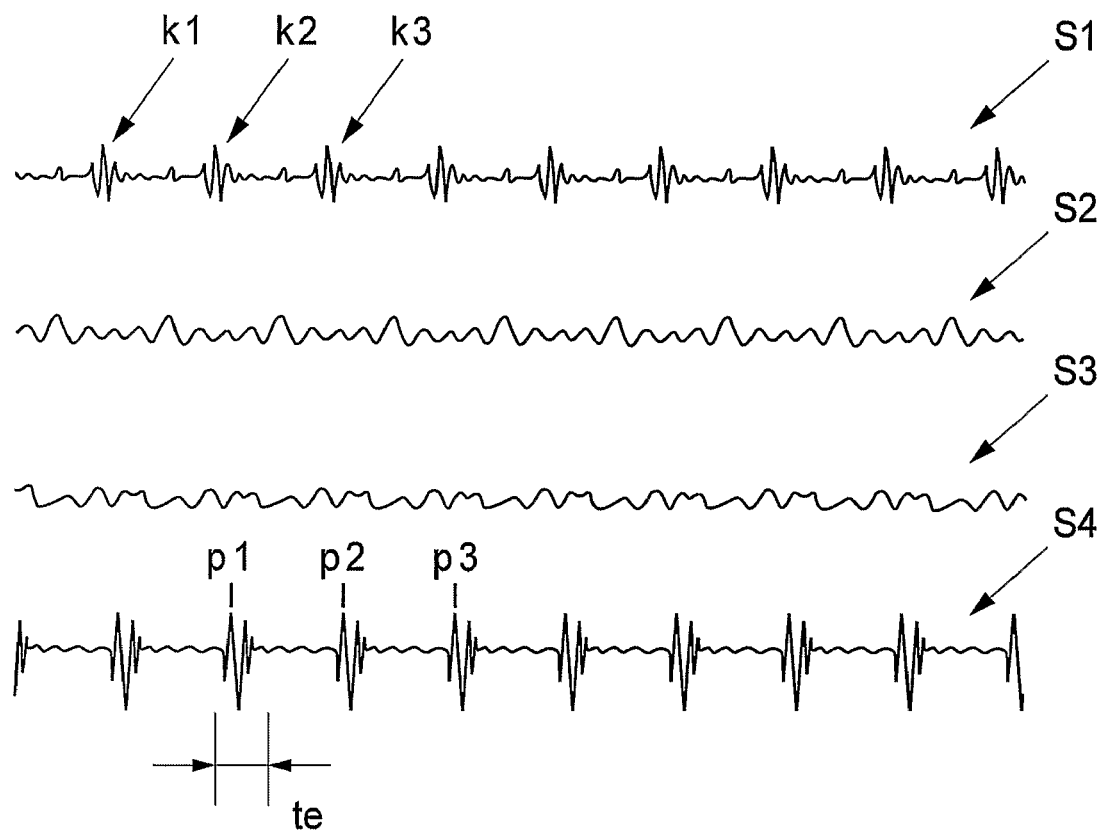
FIG. 2 shows in a time-domain, signals detected by four geophones.

FIG. 2 shows seismic wave data in the form of signals s1, s2, s3, s4, detected by four of the geophones, indicating a series of events k1, k2, k3 at the drill bit. (Preferably, the signals are filtered in a manner known in the art.) The method comprises identifying, in the data from the geophones, the events at the drill bit. The events can be of different kinds, depending on the type of drill equipment used, and the type of rock drilled in. For example, an event could be a part of the rock coming loose due to the influence of the drill bit, or, in case the drill bit is adapted to perform a hammering action, an impact of the drill bit against the rock. In general, the events can be any sort of occurrence at the drill bit, and do not necessarily appear in the absolute vicinity of the drill bit. An event can also occur at a distance from the drill bit, which distance is small or negligible compared to the distances between the drill bit and the geophones. For example, when a piece of rock comes loose due to the influence of the drill bit, this event in the rock can extent at some distance away from the drill bit itself.

In FIG. 2 the sequence of events have a frequency that is approximately constant. However, the method is equally applicable in cases where the frequency of the events changes rapidly and often, or where the events are distributed in time without any apparent pattern.

As can be seen in FIG. 2, an individual event k1, k2, k3 is represented in the signal s1, s2, s3, s4 as a time region, te, with an increased amplitude. It can also be seen that the events of each signal have similar appearances. The signals s1, s2, s3, s4 are auto-correlated, which means that corresponding points in time p1, p2, p3 are chosen within the time regions, te, so that the relative time differences between the events within the signal can be unambiguously distinguished. In other words, a correlation between events, as detected by each geophone, is calculated.

Figure 2A:
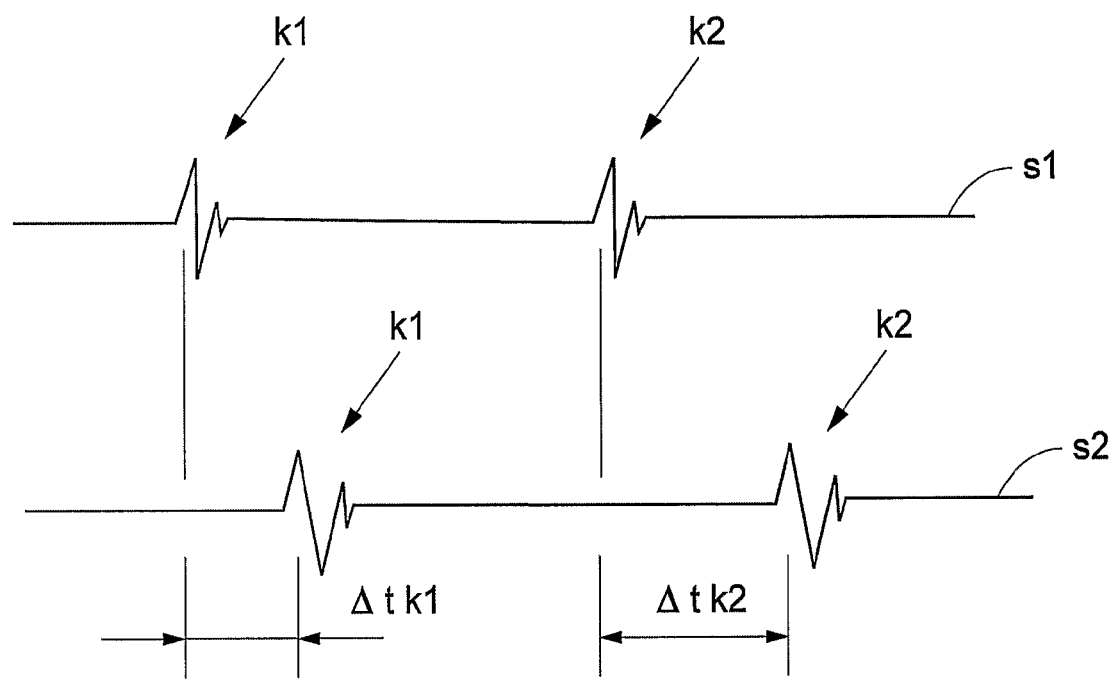
FIG. 2a shows in a time-domain, signals detected by two geophones.

Reference is made to FIG. 2a. Subsequently, the signals s1, s2, s3, s4 are cross-correlated, which means that the signals are mapped against each other so that parts thereof indicating the same events k1, k2 are identified. Thereby, signal curves from each geophone can be time shifted and compared to each other to find a match. In other words, this step includes time-alignment of the signals of the geophones. The reason for this being possible is that we have discovered that, even in cases where the sequence of events have a frequency that appears constant, the events never occur with an absolute constant frequency, i.e. the time between each event at the drill bit varies somewhat. Further, interferences and signal deviations result in an irregular curve. It is thus possible to compare the signals from the various sensors, to identify corresponding deviations, (or to find a match) in separate signals, and to time shift them so as to obtain a common point in time.

After the cross-correlation, for at least some of the geophones or signals s1,s2, a difference in arrival time of seismic waves from two events k1, k2, one following the other, is determined. Since the "departure time" of the waves is unknown, a reference signal is used. Here the reference signal is a signal s1 from a geophone other than the one for which a difference in arrival time of seismic waves is to be determined. This is exemplified in FIG. 2a. For the geophone providing the signal s2, the arrival times $\Delta tk1$, $\Delta tk2$ of the waves from a first and a second event k1, k2 are determined as the difference of absolute times between the geophone for which a difference in arrival time of seismic waves is to be determined, and the reference signal s1. Thus, for a geophone i, the observed difference in arrival time of seismic waves from two events k1, k2 is determined as $t_d^{obs}(i,k_1,k_2) = \Delta tk2 - \Delta tk1$.

By using auto-correlation as described above, an arrival time difference between two events can be estimated with high accuracy. Also, the accuracy in the estimation can be assumed to be related to the cross-correlation value. Preferably, if the correlation between two successive events recorded by a geophone, is less than a predefined value, preferably in the range 0.7-0.9, the resulting difference in arrival time may be discarded, assuming faulty influence or reflection disturbance.

Based on the seismic wave propagation velocities and the difference in arrival time $t_d^{obs}(i,k_1,k_2)$ of seismic waves at least some of the geophones, a position of the drill bit at the second event k2 in relation to a position of the drill bit at the first event k1 is determined. Three geophones can be used for this, resulting in a non-overdetermined equation system for solving the relative position of the drill bit. Preferably, in practice signals more than three geophones are used, which results in an over-determined equation system for determining the position of the drill bit.

As explained in WO01/75268A1, to solve the over-determined problem, a sum of squared residual terms is minimised, the residual terms being arrival time difference residuals defined as $$e_d(i,k_1,k_2) = t_d^{obs}(i,k_1,k_2) - T(i,k_2) + T(i,k_1),$$

where $t_d^{obs}(i,k_1,k_2)$ is the observed difference in arrival time, for geophone i, for events $k_1$ and $k_2$, and $T(i,k)$ is the theoretical arrival time, for event k. Such a sum of squared residual terms could be expressed as $$Q = \sum_{i=1}^{m} \sum_{k_1=1}^{n-1} \sum_{k_2=k_1+1}^{n} e_d^2(i, k_1, k_2),$$

where n is the number of seismic wave events. As explained in WO01/5268A1, including only a limited number of terms, such as the p last terms, limits the maximum processing steps needed for the estimation of the present position of the drill bit. If only the p last terms are included, Q could be expressed as $$Q = \sum_{i=1}^{m} \sum_{k_1=n-p-1}^{n-1} \sum_{k_2=k_1+1}^{n} e_d^2(i, k_1, k_2).$$

Generally, the events which are to be included in Q, could be selected according to some other criterion, such as including only those events that are estimated to have originated from a position further away from the other events than a distance larger than the spatial resolution of the device using the method according to the invention.

Thus, minimising the sum Q above given values of the theoretical arrival times $T(i,k)$. From the theoretical arrival times $T(i,k)$ and the seismic wave propagation velocities, the relative distances, positions or vectors $\bar{r}_d(k_1,k_2)$ between events can be calculated. The relative distances, or vectors $\bar{r}_d(k_1,k_2)$ each give a position of the drill bit at a following event in relation to a position of the drill bit at a preceding event. In other words, the relative distances, $\bar{r}_d(k_1,k_2) = \bar{r}(k_2) - \bar{r}(k_1)$, between the positions of the drill bit at events $k_1$ and $k_2$, are calculated so as to give theoretical arrival times $T(i,k)$, which minimises Q.

Figure 3:
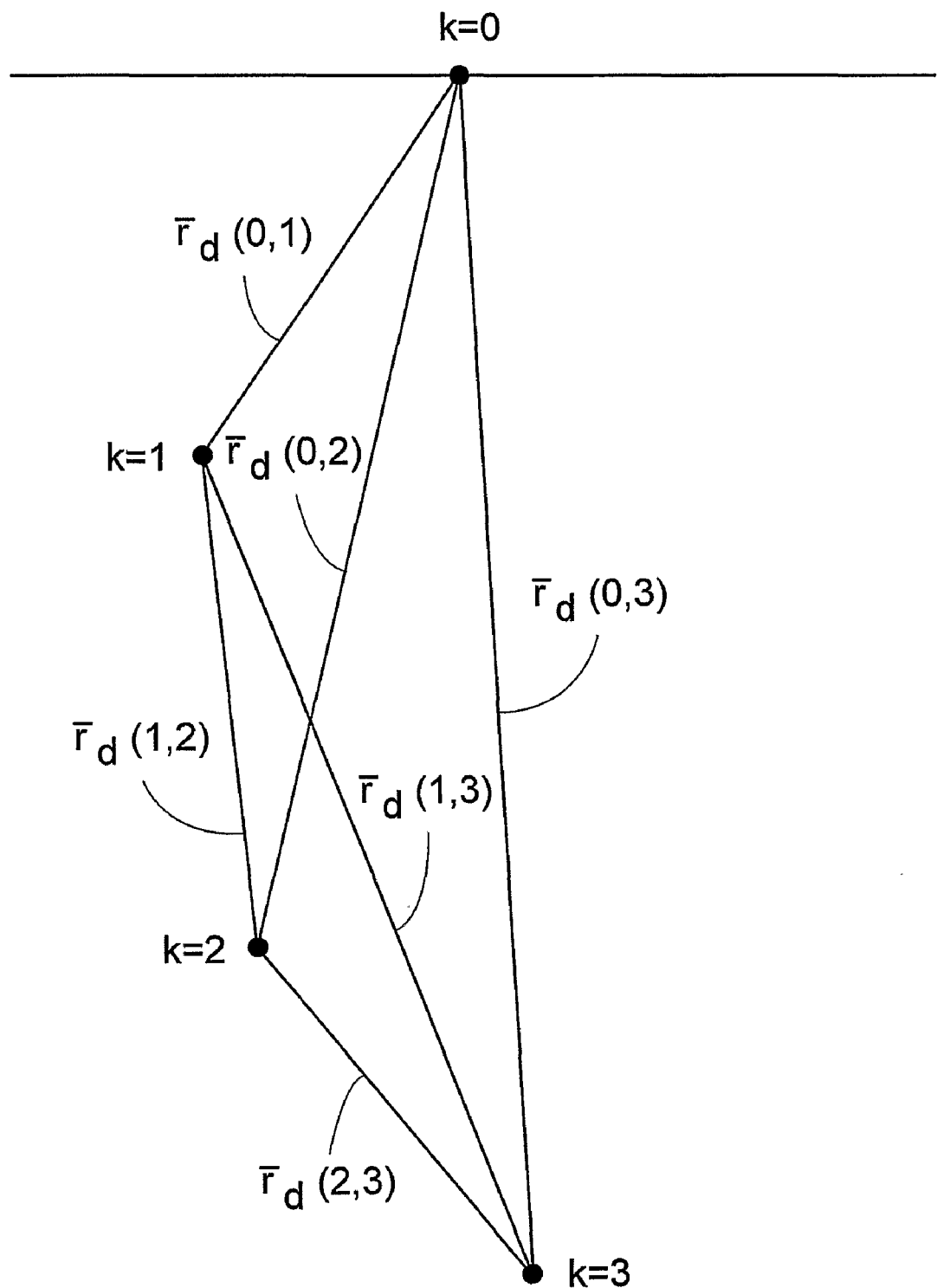
FIG. 3 shows a vertical cross-section of a rock, with a series of estimated positions for a drill trajectory.

Thus, a plurality of relative positions $\bar{r}_d(k_1,k_2) = \bar{r}(k_2) - \bar{r}(k_1)$ of the drill bit are determined based on the seismic wave propagation velocities and differences in arrival time $t_d^{obs}(i, k_1, k_2)$, at detectors, of seismic waves from events k1, k2. The absolute position of the drill bit is determined based on the starting position $\bar{r}_{start}$ and a sum of the relative positions. In FIG. 3, four events, and the position of the drill bit at these events numbered k=0 to k=3, are shown. At event k=0, the drill is at its starting position, $\bar{r}_{start}$. The relative distances between events, which minimise the sum of the arrival time difference residuals, are finally added to the starting position, $\bar{r}_{start}$, and the present position of the drill bit, $\bar{r}_{present}$, is estimated. As can be seen from the figure, this summing can be done in different ways, as the present position of the drill bit can be estimated by $$\bar{r}_{present} = +\bar{r}_{start} + \bar{r}_d(0,1) + \bar{r}_d(1,2) + \bar{r}_d(2,3), \text{ or}$$

$$\bar{r}_{present} = +\bar{r}_{start} + \bar{r}_d(0,1) + \bar{r}_d(1,3), \text{ or}$$

$$\bar{r}_{present} = +\bar{r}_{start} + \bar{r}_d(0,2) + \bar{r}_d(2,3), \text{ or}$$

$$\bar{r}_{present} = +\bar{r}_{start} + \bar{r}_d(0,3).$$

Figure 3A:
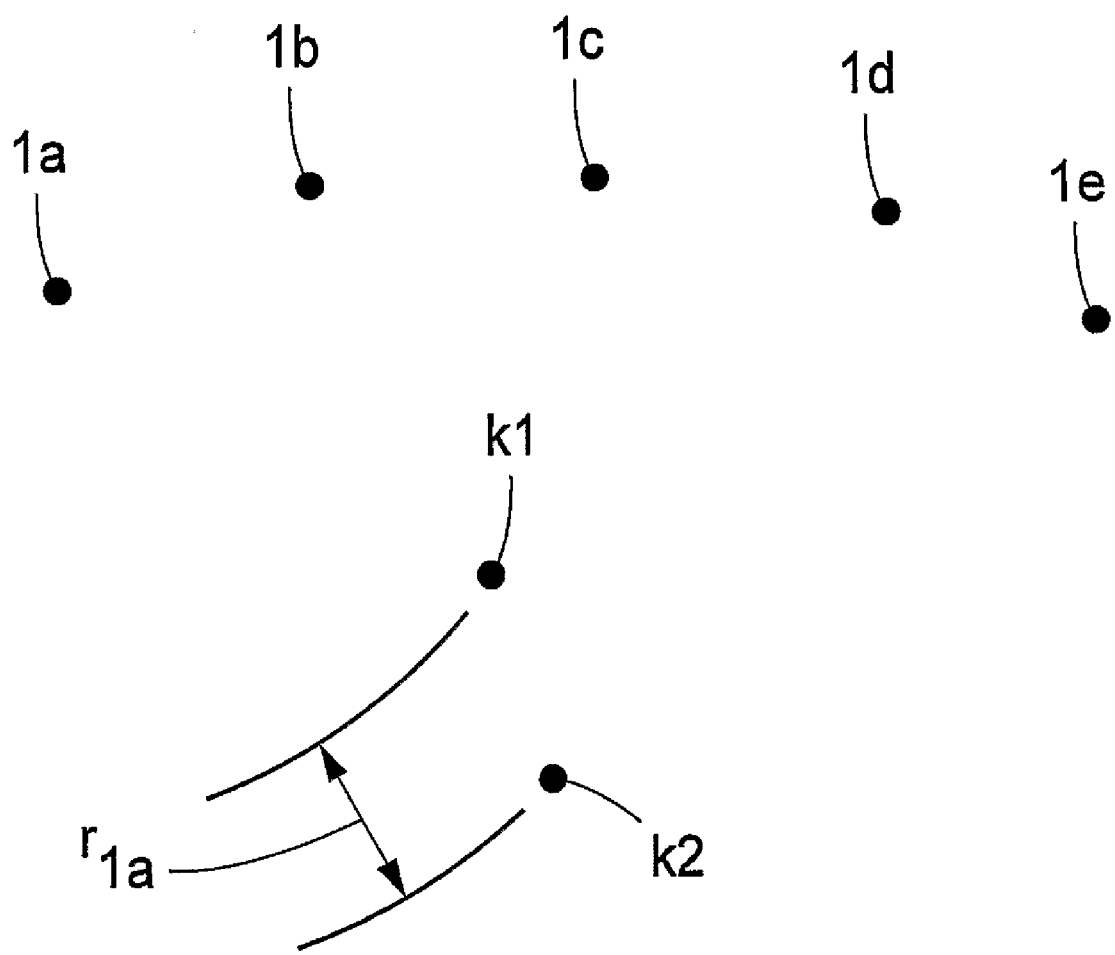
FIG. 3a shows schematically positions of a drill and geophones.

Reference is made to FIG. 3a. According to the present invention, the propagation velocities of the seismic waves are re-determined during the drilling process. As an example, for each of at least some of the geophones 1a-1e a first seismic wave propagation velocity $v1_{1a}$, $v1_{1b}$, $v1_{1c}$, $v1_{1d}$, $v1_{1e}$ between the drill bit and the respective detector is determined. Using more geophones than theoretically needed, resulting in an over-determined equation system in the determination of a further position of the drill bit position, for example as described above, a position of the drill bit at a second event k2 in relation to a position of the drill bit at a first event k1 is determined, based partly on seismic wave data from at least some of the detectors and the first seismic wave propagation velocities $v1_{1a}$, $v1_{1b}$, $v1_{1c}$, $v1_{1d}$, $v1_{1e}$ relating to these detectors. Based partly on the determined position of the drill bit at the second event k2, a second seismic wave propagation velocity $v2_{1a}$ between the drill bit and a detector 1a is determined. For example, this can be done as follows (see also FIG. 3): The distance between the detector 1a, for which a second seismic wave propagation velocity $v2_{1a}$ is to be determined, and the position of the drill bit at one of the events k1 is determined. The distance between said detector 1a and the position of the drill bit at the other event k2 is determined. The difference $r_{1a}$ between said distances is determined. The second seismic wave propagation velocity $v2_{1a}$ is determined as said distance difference $r_{1a}$ divided by the difference in arrival time $t_d^{obs}(1a, k_1, k_2)$, at the detector 1a, for which a second seismic wave propagation velocity $v2_{1a}$ is to be determined, of seismic waves from the first and second events k1, k2: $v2_{1a} = r_{1a}/t_d^{obs}(1a, k_1, k_2)$. Such a determination of a second seismic wave propagation velocity v2 can be determined for any one of the detectors, based partly on the determined position of the drill bit at the second event k2.

As an alternative, a position of the drill bit at a second event k2 in relation to a position of the drill bit at a first event k1 could be determined based on seismic wave data from a subset 1b-1e of the detectors and the first seismic wave propagation velocities $v1_{1b}$, $v1_{1c}$, $v1_{1d}$, $v1_{1e}$ relating to the detectors in the subset. Based partly on the determined position of the drill bit at the second event k2, a second seismic wave propagation velocity $v2_{1a}$ between the drill bit and a detector 1a not included in the subset could be determined.

Preferably, the seismic wave propagation velocities for individual geophones are redetermined repetitively as the drilling process proceeds. In a preferred embodiment, for each geophone, a current wave propagation velocity is determined repetitively during the process, for example each time a new drill position is calculated.

Using this method, the used propagation velocities will change with actual changes in propagation properties as the drilling proceeds. If the positions are calculated by minimising a sum, such as a sum of arrival time residuals, in an over determined problem to be solved, the calculated propagation velocity of at least one or a few of the geophones is likely to change a little in every calculation. By calculating, as described above, the propagations velocities at or near the start position, using the known positions of the start position and the geophones, correct values of the initial propagation velocities are obtained, and thus it is possible according to the present invention to maintain correct propagation velocities throughout the drilling process.

As an alternative to calculating the propagation velocities at each calculation of the position, the propagation velocities may be calculated at predetermined intervals, such as every minute or every five minutes, or when drilling has progressed a certain distance, such as 0.25 m, 0.5 m, 1 m or 5 m.

Further, the propagation properties may be considered to be constant at least two consecutive drill position calculations.

Inasmuch as the present invention is subject to variations, modifications and changes in detail, some of which have been stated herein, it is intended that all matter described throughout this entire specification or shown in the accompanying drawings be interpreted as illustrative and not in a limiting sense. Below some exemplary variations are pointed out:

At least one re-determination of at least one seismic wave propagation velocity can dependent partly on the length of the drill rod fed into the ground during drilling. Thereby, simultaneously a new seismic wave propagation velocity can determined for most of, or all of the geophones. This can be useful, especially during deep drilling, when the seismic wave propagation velocity changes gradually for all the geophones, for example due to changing rock pressure.

Figure 4:
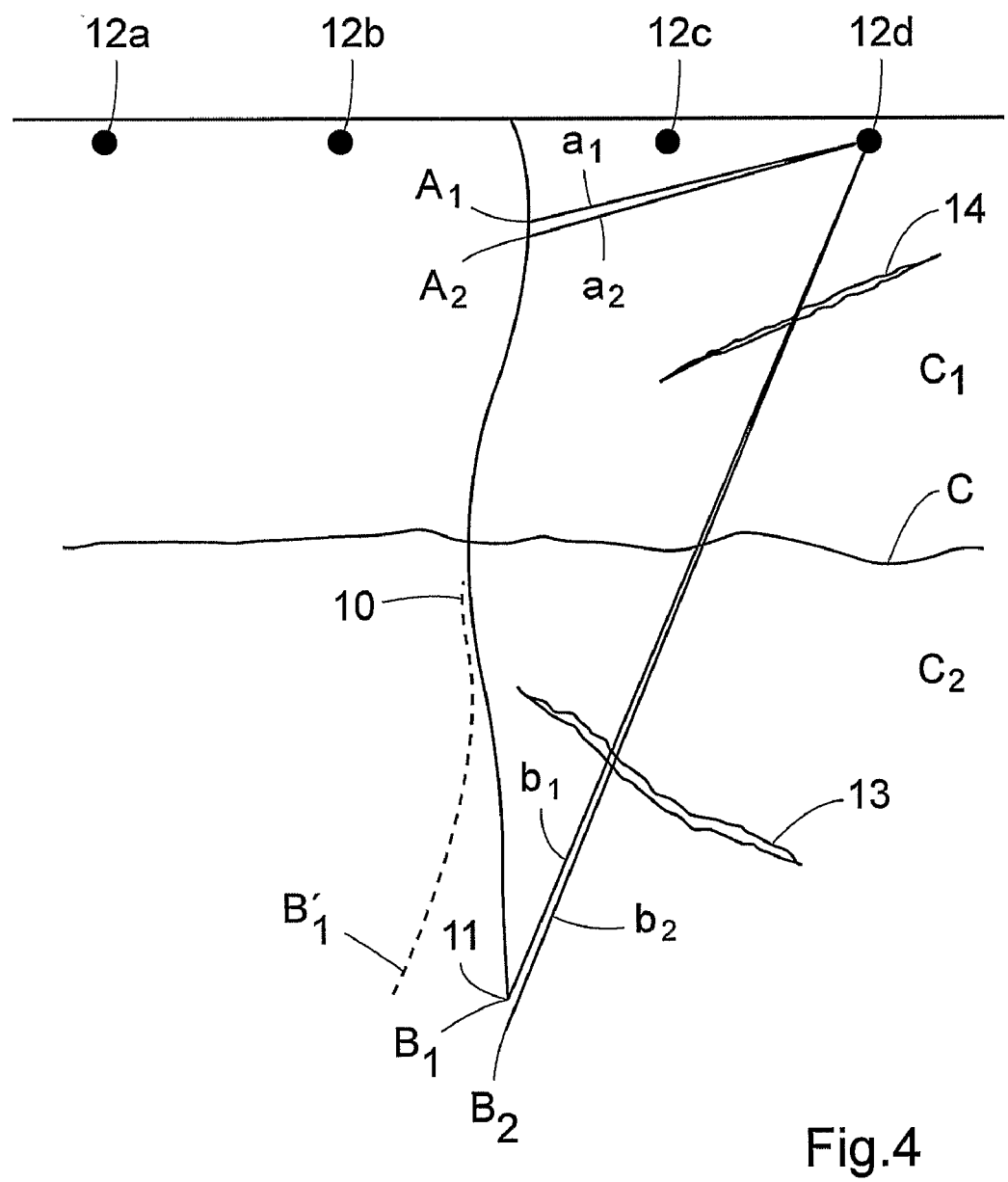
FIG. 4 shows a vertical cross-section of an inhomogeneous rock, with an ongoing drilling process.

Errors in the calculated position of the drill bit due to e.g. waves reflected by cracks in the rock, which could cause the trajectory to show a discontinuity such as the line C in FIG. 4, i.e. a sudden shift in the previously smooth trajectory curve, could be compensated for by using various methods. Such a sudden shift could be assumed being a result of an erroneous measurement, if the relative distance between the last two positions of the drill bit deviates strongly from the relative distance between the second last two positions, by e.g. a factor of two. In such a case, the latest relative position could be replaced by the second latest relative position, but more complicated algorithms for calculating the latest relative position could be used, such as a polynomial fit to a number of positions prior to the latest one. If the length of the drill that enters the hole is being measured as the drill bit makes its way through the rock, this could also be used for calculating the actual latest relative position between the last two events. Further, when using more geophones than theoretically necessary, e.g. 8 or more, and when appropriate signals are received from more geophones than is necessary to calculate the position, the position may be calculated with various subsets of the geophones to thereby find out which signals that result in the most probable position. When the propagation velocities then are calculated, the discontinuity is accounted for in the following measurement.

Instead of the square sum Q as defined above, in general, any function, other than the square function, which is an increasing function for positive valued residuals and a decreasing function for negative valued residuals could be used, such as the absolute value of the residuals, the residuals raised to fourth power, or even a function of the residuals which is not even, as long as it fulfils this criterion. Additionally, these functions which are increasing for positive valued residuals and decreasing for negative valued residuals, need not necessarily be summed. As an example, the product could be calculated and minimised instead. In the most general case, any function of the residuals, which is increasing for each positive valued residual and decreasing for each negative valued residual could be minimised.

As also explained in WO01/75268A1, the residuals can be weighted, and a sum of squared residuals can be expressed as $$Q = \sum_{i=1}^{m} \sum_{k_1=1}^{n-1} \sum_{k_2=k_1+1}^{n} w_d(i, k_1, k_2) e_d^2(i, k_1, k_2).$$

If a more general function Q is used, the residuals could be weighted in an identical fashion, or alternatively the weights could be included in the properties of Q itself.

As explained in WO01/75268A1, using relative distances between non-consecutive events could give an increased accuracy, but it is advantageous to give such relative distances a smaller weight factor than relative distances between consecutive events.

The sum comprising the relative distances may comprise the relative distances between events which are not adjacent, $\bar{r}_d(k,k+m)$, where m>1, and where the terms in the sum are weighted by factors w(k,m), and where the sum is normalised correspondingly by a factor N, such that $$\bar{r}_{present} = \bar{r}_{start} + \frac{1}{N} \sum_{m=1}^{n-1} \sum_{k=1}^{n-m} w(k, m) \bar{r}_d(k, k+m).$$

The weight factors, w(k,m), may decrease with increasing m.

If the latest relative distance, $\bar{r}_d(n-1,n)$, deviates largely from the previous relative distance, $\bar{r}_d(n-2,n-1)$, the latest relative distance may be set essentially equal to the previous relative distance.

The length of the drilled hole may be measured by measuring the length of the drill that has entered the hole, and a comparison may be made between the actual length of the hole and the length as calculated according to any of the previous methods. If the latest relative distance, $\bar{r}_d(n-1, n)$, deviates largely from the length of the drill that has entered the hole between events n−1 and n, $\bar{r}_d(n-1,n)$ may be set essentially equal to the previous relative distance, $\bar{r}_d(n-2,n-1)$.

Additionally, the method could include use of an expression such as $$Q = \sum_{i=1}^{m} \sum_{j=1}^{2} \sum_{k_1=1+1}^{n-1} \sum_{k_2=k_1+1}^{n} e_d^2(i, j, k_1, k_2),$$

where j denotes the phase of the seismic waves, being S or P, and also the arrival time differences between these waves, corresponding to an expression such as $$Q = \sum_{i=1}^{m} \sum_{j=1}^{2} \sum_{k_1=1}^{n-1} \sum_{k_2=k_1+1}^{n} e_d^2(i, j, k_1, k_2) +$$

$$\sum_{i=1}^{m} \sum_{k_1=1}^{n-1} \sum_{k_2=k_1+1}^{n} [e_d(i, P, k_1, k_2) - e_d(i, S, k_1, k_2)]^2.$$

More generally, Q may comprise the arrival time differences between S and P waves, such that $Q=Q(e_d(i,k_1,k_2),e_d(i,P,k_1,k_2)-e_d(i,S,k_1,k_2))$.

The final results of the method according to the invention could be presented, in real time, on a computer screen using graphics or numerical values, or any other presentation form may be used. Naturally, the results could be stored for later analysis, or sent to a remote presentation unit, for controlling the steering of the drill trajectory by en operator elsewhere.

The invention claimed is:

1. A method for determining the position of a drill bit comprising
    determining a starting position ($\bar{r}_{start}$) of the drill bit,
    determining a position of each of a plurality of seismic wave detectors,
    recording, by means of the detectors, data relating to transient seismic waves generated at the drill bit,
    identifying, based on the seismic wave data from the detectors, events (k1, k2) at the drill bit,
    determining for each of the detectors a seismic wave propagation velocity between the drill bit and the respective detector,
    determining a plurality of relative positions of the drill bit, based at least partly on the seismic wave propagation velocities and differences in arrival time ($t_d^{obs}(i, k_1, k_2)$), at at least some of the detectors, of seismic waves from events (k1, k2), and
    determining, based at least partly on the starting position ($\bar{r}_{start}$) and a sum of the relative positions, an absolute position of the drill bit,
    wherein the method comprises
    determining for each of at least some of the detectors, a first seismic wave propagation velocity ($v1_{1a}$, $v1_{1b}$, $v1_{1c}$, $v1_{1d}$, $v1_{1e}$) between the drill bit and the respective detector,
    determining, based at least partly on first seismic wave propagation velocities relating to at least some of the detectors, a position of the drill bit at a second event (k2) in relation to a position of the drill bit at a first event (k1), and
    determining a second seismic wave propagation velocity ($v2_{1a}$) between the drill bit and at least one of the detectors, based at least partly on the determined position of the drill bit at the second event (k2).

2. A method according to claim 1, wherein the step of determining a second seismic wave propagation velocity ($v2_{1a}$) between the drill bit and at least one of the detectors, is performed partly based on the difference in arrival time ($t_d^{obs}(1a, k_1, k_2)$), at the at least one detector, of seismic waves from the first and second events (k1, k2).

3. A method according to claim 1, wherein at least one re-determination of at least one seismic wave propagation velocity is dependent partly on the length of the drill rod fed into the ground.

4. A method according to claim 1, wherein at least some of the seismic wave propagation velocities is re-determined repetitively as the drilling process proceeds.

5. A method according to claim 1, wherein the seismic wave propagation velocity is re-determined at predetermined time intervals.

6. A method according to claim 1, comprising performing time-alignment of the seismic wave data of at least some of the detectors based at least partly on frequency deviations and/or noise and/or other deviations of the detector signals.

7. A method according to claim 1, comprising time-shifting of seismic wave data of at least one of title detectors to obtain signal conformance and thereby the difference in arrival time of seismic waves from two events.

8. A system for determining the position of a drill bit, comprising a plurality of seismic wave detectors and computation means,
the detectors being configured to record data relating to transient seismic waves generated at the drill bit,
the computation means being configured to identify, in the seismic wave data from the detectors, events (k) at the drill bit,
to determine for each of the detectors a seismic wave propagation velocity between the drill bit and the respective detector,
to determine a plurality of relative positions of the drill bit, based at least partly on the seismic wave propagation velocities, positions of the detectors and differences in arrival time ($t_d^{obs}(i, k_1, k_2)$), at at least some of the detectors, of seismic waves from events (k1, k2), and
determining, based at least partly on a starting position ($\bar{r}_{start}$) of the drill bit and a sum of the relative positions, an absolute position of the drill bit,
wherein the computation means is configured
to determine, for each of at least some of the detectors, a first seismic wave propagation velocity ($v1_{1a}$, $v1_{1b}$, $v1_{1c}$, $v1_{1d}$, $v1_{1e}$) between the drill bit and the respective detector,
to determine, based at least partly on first seismic wave propagation velocities relating to at least some of the detectors, a position of the drill bit at a second event (k2) in relation to a position of the drill bit at a first event (k1), and
to determine a second seismic wave propagation velocity ($v2_{1a}$) between the drill bit and at least one of the detectors, based at least partly on the determined position of the drill bit at the second event (k2).

9. A system according to claim 8, wherein the computation means is configured to perform the determination of a second seismic wave propagation velocity ($v2_{1a}$) between the drill bit and at least one of the detectors, partly based on the difference in arrival time ($t_d^{obs}(1a, k_1, k_2)$), at the at least one detector of seismic waves from the first and second events (k1, k2).

10. A system according to claim 8, wherein the computation means is configured to perform at least one re-determination of at least one seismic wave propagation velocity dependent partly on the length of the drill rod fed into the ground.

11. A system according to claim 8, wherein the computation means is configured to re-determine the seismic wave propagation velocity repetitively as the drilling process proceeds.

12. A system according to claim 8, wherein the computation means is configured to re-determine the seismic wave propagation velocity at predetermined time intervals.

13. A system according to claim 8, wherein the computation means is configured to make time-alignment of the seismic wave data of at least some of the detectors based at least partly on frequency deviations and/or noise and/or other deviations of the detector signals.

14. A system according to claim 8, wherein the computation means is configured to time-shift seismic wave data of at least one of the detectors to obtain signal conformance and thereby the difference in arrival time of seismic waves from two events.

* * * * *